Jan. 5, 1937.　　　F. J. WESTROPE　　　2,066,501
DECK SUPPORT AND TROUGH
Filed Nov. 9, 1934
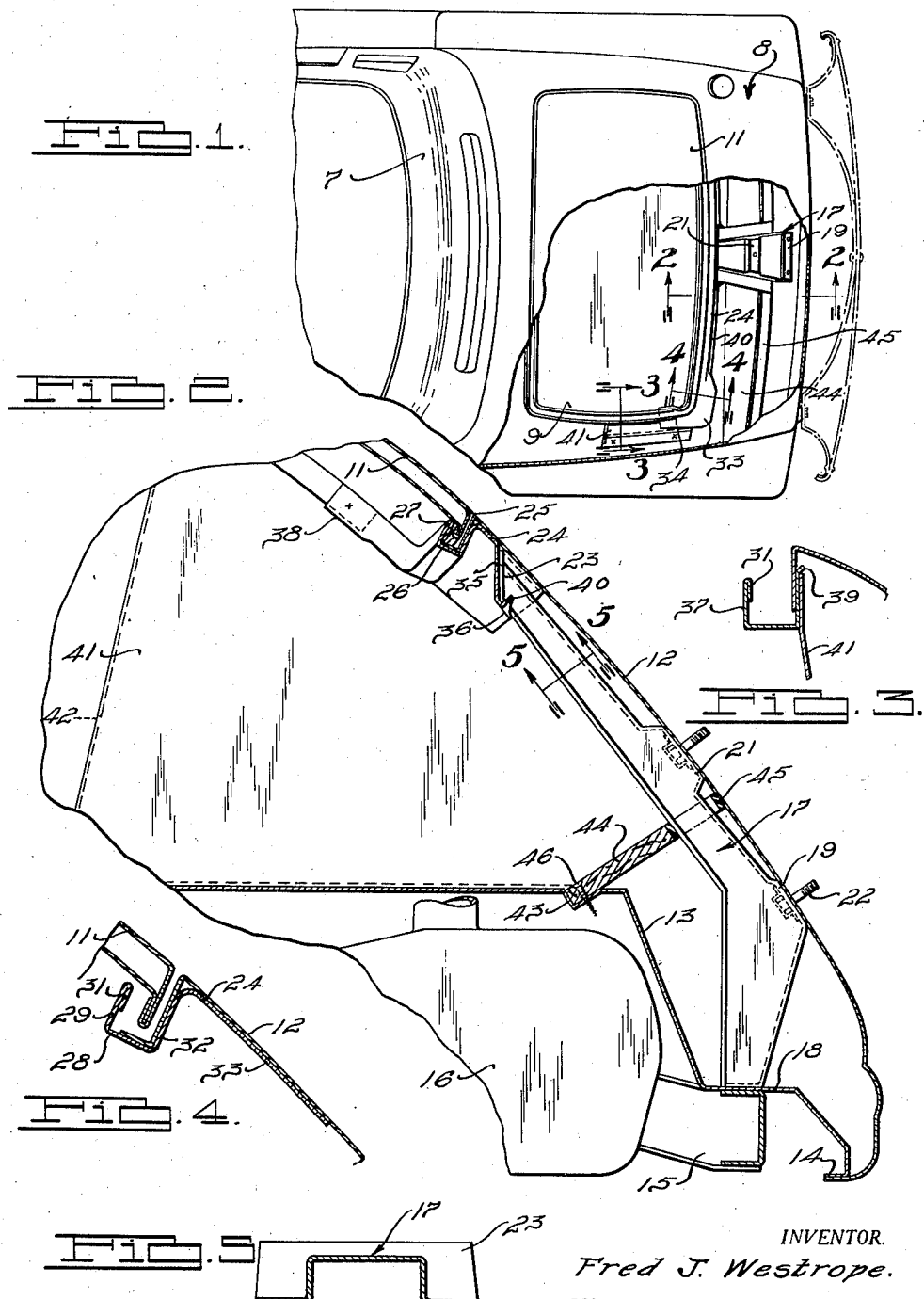
INVENTOR.
Fred J. Westrope.
BY
Harness, Dickey, Pierce & Hann
ATTORNEYS.

Patented Jan. 5, 1937

2,066,501

UNITED STATES PATENT OFFICE 2,066,501

DECK SUPPORT AND TROUGH

Fred J. Westrope, Detroit, Mich., assignor to The Murray Corporation of America

Application November 9, 1934, Serial No. 752,191

8 Claims. (Cl. 296—28)

My invention relates to vehicle bodies and particularly to a deck construction therefor and to bracing members for strengthening the edge of the deck which defines an opening therein.

While channel elements have been employed heretofore about the opening in a deck of a vehicle body for receiving the flange of a door covering the opening, such a channel element did not constitute a brace or support for the paneling. Usually the drain channel was of constant section and made by use of rolls and no brace could, therefore, be afforded by such construction.

In view of the sloping construction of the deck in the present day bodies, requiring large deck panels, other means besides the flanging of the panel edge is required to strengthen the panel and prevent it from being distorted or cracked from vibration. While various means may be provided for strengthening a panel, I propose to incorporate in the channel element defining the marginal edge of the deck opening, a brace and strengthening portion, the utility of which will be readily apparent.

Accordingly the main objects of my invention are: to provide a portion of a channel element disposed about an opening in a panel with extending portions which brace and strengthen the panel when supported thereon; to provide a trough about a panel opening having extending flanged portions which engage the panel when supported by side braces to add strength thereto; to provide a channel about an opening in a panel which is supported by side braces and which is extended to engage the panel to strengthen the corners thereof at the opening; to provide a channel element having bracing means thereon about a portion of the opening in a panel joined to additional channel elements which complete the channel about the opening with means at the sides of the opening bracing the channel and the paneling; and in general to provide a trough about an opening in a panel with flanged portions which strengthen and brace the panel and which is simple in construction and economical of manufacture.

Other objects and features of novelty of my invention will be either specifically pointed out or will become apparent when referring, for a better understanding of my invention, to the following description taken in conjunction with the accompanying drawing, wherein:

Figure 1 is a broken plan view of a vehicle body embodying features of my invention, Fig. 2 is an enlarged sectional view of the structure illustrated in Fig. 1, taken on the line 2—2 thereof, Fig. 3 is an enlarged sectional view of the structure illustrated in Fig. 1, taken on the line 3—3 thereof, Fig. 4 is an enlarged sectional view of the structure illustrated in Fig. 1, taken on the line 4—4 thereof, and Fig. 5 is an enlarged sectional view of the structure illustrated in Fig. 2, taken on the line 5—5 thereof.

I have illustrated a body 7 of the coupe type, having a rear deck 8 provided with an opening 9 which is closed by a deck door 11. The deck 8 is formed by a panel 12 which is jointed by a floor pan 13 at the lower body edge 14 and supported on a chassis frame 15 in the usual manner. The pan 13 is projected downwardly to have the panel 12 encompass a gas tank 16 of the automobile 7. The greater length of the panel 12 by this construction requires further bracing of the panel about the deck opening 9.

A bracket 17 is extended from a ledge 18 of the floor pan 13 supported on a cross member provided on the chassis 15, as illustrated in Fig. 2. The bracket 17 has projecting portions 19 and 21 in engagement with the panel 12 and with studs 22 upon which the spare wheel is mounted. The opposite end of the brace 17, to that resting upon the ledge 18, is preformed to provide a vertically disposed flange 23 which engages a flange on a channel bracing element 24 which is secured to the edge of the panel 12. The panel 12 is flanged inwardly at 25 about the opening 9 and at the rear end is further flanged forwardly at 26. The deck door 11 is of a shape to inter-fit with opening 9 and the edge of the panel 12 as illustrated in Figs. 1 and 2, and is provided with a marginal flange 27, the purpose of which will be explained hereinafter.

The channel bracing element 24 is constructed from a sheet of metal which is preformed at the inner edge to provide a channel 28 having the end of the inner flange 29 reversely bent and disposed flat upon itself. An opposite flange 32 is extended at 33 to conform to the shape of the panel 12, as is illustrated more clearly in Fig. 4. The reinforcing element 24 is extended at 34 to have the channel portion 18 project around the lower corners of the opening 9, as illustrated in Fig. 1 and to have the wide extending portion 33 mate with the paneling at the corner. The extending portion 33 braces the panel and strengthens the corners preventing the panel at the corners from cracking which might occur due to vibration.

Intermediate the ends of the channel 24 the extending portions 33 are deflected at 35 and projected outwardly at 36, to mate with the flange 23 and the brace 17 which are welded or otherwise secured together, and deflected upwardly at 40 to further strengthen and brace the panel 12. It will be noted that the element 24 is of slightly heavier sheet material than that of the panel 12 to provide further strength for bracing the panel. An additional channel element 37 is mated with the flange 25 at the sides and top of the opening 9 and with the expanded ends 34 of the channel element 24 and to be welded or otherwise secured thereto in unit relation. The channel 37 likewise has one flange reversely bent upon itself at 31 the same as the flange 29 of the channel element 24. The inner flange of the channel is preferably flanged outwardly at 39 to aid in the assembly of the channel 37 and 38 onto the flange 25 of the panel. At either side of the opening reinforcing plates 41, having outwardly extending flanges 42 thereon are provided, secured to the floor pan 13 at the lower end and welded or otherwise secured to the side of the channel 37 and 38, as illustrated in Fig. 3. The plates 41 further strengthen and position the channel and panel relative to the floor pan 13.

In Fig. 2, I have illustrated an angle shaped recess 43 in the floor pan 13 which is employed to receive and support one end of a closure panel 44. The outer edge of the panel 44 is preferably provided with a cushioning material 45 for engaging the inner surface of the deck panel 12. The panel 44 and material 45 seal the top portion of the floor pan with the deck panel to cut off the rearwardly extending portion from the inner compartment. This prevents articles in the compartment from falling within the space between the downwardly deflected floor pan 13 and outer panel at the rear skirt of the body. Suitable screws 46 may be employed for retaining the panel 44 to the floor pan 13.

The rear deck construction of the vehicle is materially simplified and strengthened by the construction herein illustrated and described. A channel is provided about the opening 9 in the deck panel 12 into which the flange 27 of the deck door 11 projects to form a water-tight closure for the compartment. Any water falling upon the deck will run into the channel and will be conducted through a suitable conduit from the bottom of the compartment. The lower portion of the channel is a separate element which is extended to brace the corners of the opening and further preformed to mate with and support the ends of a brace which extends from the rear portion of the body which rests upon the chassis frame, the brace carries studs upon which the spare wheel of the vehicle is mounted. The construction is unique in that the channel element is extended to form the bracing element for the corners of the deck panel and to mate with and form a unit construction with the central brace of the paneling.

While I have described and illustrated but a single embodiment of my invention it will be apparent to those skilled in the art that various changes, additions, omissions and substitutions may be made therein without department from the spirit and scope of my invention, as set forth in the accompanying claims.

I claim as my invention:

1. A vehicle body having an opening in the panel, a door for said opening, a channel element matable with the marginal edge of said opening in a position to receive the edge of said door, said channel having an extending flange a portion of which mates with said panel, and another portion of which is deflected therefrom, and a bracing element engaging said deflected portion.

2. In a vehicle body rear deck having an opening therein, the marginal edge of the panel of which is flanged inwardly and a channel element extending along the bottom and a portion of the sides of said opening and having its inner flange extended to project along the inner surface of the deck panel at the corners to strengthen and brace the corners.

3. In a vehicle body rear deck having an opening therein, the marginal edge of the panel of which is flanged inwardly, a channel element extending along the bottom and a portion of the sides of said opening and having its inner flange extended to project along the inner surface of the deck panel at the corners to strengthen and brace the corners, the extended portion between the corners being deflected from the panel and a bracing element engaging said deflected portion.

4. In a vehicle body rear deck having an opening therein, the marginal edge of the panel of which is flanged inwardly, a channel element extending along the bottom and a portion of the sides of said opening and having its inner flange extended to project along the inner surface of the deck panel at the corners to strengthen and brace the corners, the extened portion between the corners being deflected from the panel, a bracing element engaging said deflected portion, and an additional channel element extending along the top and the remaining portion of the sides and welded to said first channel element.

5. In a vehicle body rear deck having an opening therein, the marginal edge of the panel of which is flanged inwardly, a channel element along the bottom and a portion of the sides of said opening and having its inner flange extended to project along the inner surface of the deck panel at the corners to strengthen and brace the corners, the extended portion between the corners being deflected from the panel, a bracing element engaging said deflected portion, and an additional channel element extending along the top and the remaining portion of the sides and welded to said first channel element, said additional channel element having the outer flange deflected outwardly to receive the marginal flange of the panel.

6. In a vehicle body rear deck having an opening therein, the marginal edge of the panel of which is flanged inwardly, a channel element extending along the bottom and a portion of the sides of said opening and having its inner flange extended to project along the inner surface of the deck at the corners to strengthen and brace the corners, the extended portion between the corners being deflected from the panel, a bracing element engaging said deflected portion, an additional channel element extending along the top and the remaining portion of the sides and welded to said first channel element, said channel portion having its outer flange deflected outwardly to receive the marginal flange of the panel, and side braces extending between the floor of the vehicle and the channel elements for supporting and bracing the channel elements from the floor.

7. In a vehicle body rear deck having an opening therein, the marginal edge of the panel of which is flanged inwardly, a channel element extending along the bottom and a portion of the sides of said opening and having its inner flange extended to project along the inner surface of the deck panel at the corners to strengthen and brace the corners, the extended portion between the corners being deflected from the panel, a bracing element engaging said deflected portion, an additional channel element extending along the top and the remaining portion of the sides and welded to said first channel element, side braces extending between the floor of the vehicle and the channel elements for supporting and bracing the channel elements from the floor, and a central brace engaging said deflected portion.

8. In a vehicle body rear deck having an opening therein, the marginal edge of the panel of which is flanged inwardly, a channel element extending along the bottom and a portion of the sides of said opening and having its inner flange extended to project along the inner surface of the paneling at the corners to strengthen and brace the corners, the portion between the corners being deflected from the panel, a bracing element engaging said deflected portion, an additional channel element extending along the top and the remaining portion of the sides and welded to said first channel element, side braces extending between the floor of the vehicle and the channel elements for supporting and bracing the channel elements from the floor, a central brace engaging said deflected portion, said central brace being provided with extending bosses, and wheel supporting studs carried by said bosses.

FRED J. WESTROPE.